United States Patent [19]

Sonuparlak et al.

[11] Patent Number: 4,777,153
[45] Date of Patent: Oct. 11, 1988

[54] PROCESS FOR THE PRODUCTION OF POROUS CERAMICS USING DECOMPOSABLE POLYMERIC MICROSPHERES AND THE RESULTANT PRODUCT

[75] Inventors: Birol Sonuparlak; Ilhan A. Aksay, both of Seattle, Wash.

[73] Assignee: Washington Research Foundation, Seattle, Wash.

[21] Appl. No.: 860,073

[22] Filed: May 6, 1986

[51] Int. Cl.[4] .................. C04B 38/06; C04B 33/28; C04B 38/00; B28B 1/26
[52] U.S. Cl. .......................... 501/82; 264/44; 264/60; 264/61; 264/66
[58] Field of Search .............. 264/44, 60, 61, 66; 501/82

[56] References Cited

U.S. PATENT DOCUMENTS

| | | | |
|---|---|---|---|
| 3,792,136 | 2/1974 | Schmitt | 264/44 |
| 3,832,426 | 8/1974 | Malthouse et al. | 264/44 X |
| 4,010,242 | 3/1977 | Iler et al. | 264/44 X |
| 4,522,744 | 6/1985 | Argall et al. | 264/44 X |

OTHER PUBLICATIONS

Evans, A. G.; D. R. Biswas and R. M. Fulrath, "Some Effects on the Fracture of Ceramics: II, Spherical Cavities", in *Journal of the American Ceramic Society*, vol. 62, No. 1-2, Jan.-Feb. 1979, pp. 101-106.

Biswas, Dispak R. and Richard M. Fulrath, "Strength of Porous Polycrystalline Ceramics", in *Transactions and Journal of the British Ceramic Society*, vol. 79, No. 1, 1980, pp. 1-5.

*Primary Examiner*—Philip Anderson
*Attorney, Agent, or Firm*—Christensen, O'Connor, Johnson & Kindness

[57] ABSTRACT

A process for producing porous ceramics with controlled microstructure. Colloidal suspensions of polymeric microspheres of a selected size and shape, and aluminum oxide particles are consolidated to form a compact. The compact is heated to decompose the microspheres to leave pores, and to sinter the compact, to form a porous ceramic body with a plurality of pores preferably substantially the same size and shape, where the pores are substantially spherical and are evenly distributed and noncontiguous throughout the ceramic matrix and with strength comparable to its dense state.

56 Claims, 6 Drawing Sheets

PROCESS FOR THE PRODUCTION OF POROUS CERAMICS USING DECOMPOSABLE POLYMERIC MICROSPHERES AND THE RESULTANT PRODUCT

This invention was made with U.S. Government support under grant AFOSR-83-0375 awarded by the U.S. Air Force. The U.S. Government has certain rights in this invention.

FIELD OF THE INVENTION

This invention relates to a process for producing porous ceramics using polymeric microspheres and to the ceramics produced, and particularly to porous aluminum oxide ceramics.

BACKGROUND OF THE INVENTION

For most applications of ceramics, it is desirable to increase the strength of a ceramic body while decreasing its weight or density. One method to decrease the weight of a ceramic body is to introduce porosity into the body. The introduction of pores into a ceramic matrix, however, generally causes a decrease in strength of the resulting ceramic body. This effect is thought to be due to the creation of micromechanical stress concentrations in the matrix created by the presence of the pores, which results in a decrease in the overall strength of the ceramic. Applications of porous ceramics include use in medicine as artificial body joints, where weight and biocompatibility is a critical factor. In another medical application, porous ceramics may be used as bone substitutes where the porosity of the material facilitates tissue infiltration. Porous ceramics may also be used in a variety of other applications, for example as microfilters, or as electronic elements. Porosity alters the dielectric properties of ceramics, so that a porous ceramic can function as an insulator and can be used, for example, as a substrate for computer hardware such as microchips. Also, porous ceramics may be infiltrated with another material such as a metal, to form composites having preselected thermal and mechanical properties, for example, rapid heat dissipation and higher fracture toughness or, can be infiltrated by polymers to form piezoelectric ceramics which can function as transducers for use in sonar equipment. It is necessary for all these applications that the porous ceramic body retain sufficient strength to withstand the stresses of the particular application.

It has been observed that the decrease in strength of porous ceramic materials is exponential with increasing porosity content. Theoretical studies claim that strength will not show an exponential decay if the pores are spherical in shape and smaller in size. Evans, et al., *J. Amer. Ceram. Soc.* 62(1–2):101–106 (1979). Bertoletti (Bertoletti et al., *J. Amer. Ceram. Soc.* 50:558 (1967)) has investigated the effect of spherical pore size and volume fraction porosity on the strength of sodium borosilicate glass matrices incorporating nickel spheres to form the pores. Since the coefficient of thermal expansion of the nickel is larger than that of the glass, and because of a lack of bonding between the nickel spheres and the glass, the nickel spheres were expected to develop pores upon cooling. Bertoletti observed that strength increased with an increasing volume of porosity when the size of nickel spheres were less than 10 μm. The use of nickel spheres to form pores, however, does not provide for widespread applicability for the following reasons: (1) Nickel cannot be used to produce ceramic materials that require high sintering temperatures. Different ceramic materials may require different sintering procedures. Borosilicate glass, for example, may be liquid phase sintered at a relatively low temperature. Liquid phase sintering is a densification process which involves the formation of a viscous liquid phase at the firing temperature and elimination of pores by the flow of this liquid. Other ceramic materials, such as aluminum oxides, on the other hand, require higher temperature solid phase sintering in which the elimination of pores is achieved during densification by the transfer of matter from the particles or grain boundaries through the diffusion of ions. (2) When smaller pore size is desired, and smaller nickel spheres are used (approximately 5 μm), as Bertoletti suggests, the nickel spheres may bond to the glass and not separate upon cooling due to relatively small thermal contraction, so that no pores are formed (this phenomenon may account for the increased strength of the "porous" samples observed by Bertoletti using 5 to 10 μm spheres). (3) The nickel may oxidize and subsequently bond with the matrix phase, also preventing pore formation. (4) Use of nickel increases the density of material.

Biswas (Biswas et al., *Trans. J. British Ceram. Soc.*, 79, pp. 1–5 (1980)), using a glass matrix, niobium-doped lead zirconate titanate (PNZT) obtained relatively small sized pores (2 to 3 μm) by changing the sintering conditions; i.e., by lowering the sintering temperature and altering the sintering time. Biswas also used an excess of lead oxide (PbO) during liquid phase sintering. Although it might be possible to obtain small spherical pores under certain conditions simply by changing the sintering conditions, as did Biswas, it is impossible using such techniques to reach a high-volume fraction of porosity while maintaining a spherical pore shape. Volume percent porosity is the ratio of the volume of pores (voids) to the total bulk volume of the porous sample. In addition, in applications where larger pores are desired, this processing method would not be effective to tailor pore size and shape. Thus, it is difficult to adequately control porosity by merely changing the sintering parameters. In addition, a comparison of strengths of a porous sample with its dense form might be hindered using Biswas' methods because the composition and distribution of the lead oxide in the porous and dense samples might not be the same. The oxide-rich liquid phase formation has a low melting temperature (890° C.). Since sintering of the dense samples occurs at higher temperatures (1200° C.) where the lead oxide tends to melt and evaporate, the composition of the dense sample may differ from that of the porous sample. It might also be expected that some of the lead oxide liquid would crystalize during cooling from the temperature of 1100° C. used by Biswas in the fabrication of their porous samples, such that the distribution of the lead oxide within the matrix of the samples may also differ. Therefore, one would expect the measurements of the mechanical strength of the dense and porous samples in Biswas to differ not only because of the presence of pores, but also as a result of differences in phase distribution and composition between the dense and porous samples.

It has long been known that the fracture strength of ceramics is decreased by the severity of defects or "flaws," such as pores that exist throughout the ceramic material. For the most part, fractures in ceramics originate from surface flaws. Pores near the surface of the body can combine with these surface flaws and contribute to the decrease in strength. In addition, internal pores that are too close together, for example a cluster of pores, may function as a large flaw, creating a combined decrease in strength similar to that of a surface flaw. In general, the larger the pore size and the more irregular the shape (e.g., deviation from spherical), the larger the effective surface flaw size. The effect of surface flaws must be taken into account to decrease the statistical error in strength measurements of a ceramic sample.

The effects of the presence of pores on strength may be minimized by separating the pores by an optimum distance from one another. However, it has not been previously possible to closely control pore spacing and distribution to provide a porous ceramic that both minimizes the detrimental effect of surface flaws on strength in combination with pores near the surface, and maximizes the strength of the porous ceramic. Thus, until the present invention, a process for producing porous ceramics that provides the ability to control pore size, shape and spatial distribution of pores, while maintaining strength, has not been achieved.

SUMMARY OF THE INVENTION

Porous ceramics having a controlled microstructure consisting of pores of substantially the same size, shape, and evenly distributed throughout the ceramic matrix are provided in accordance with the present invention. The porous ceramics are produced by consolidation of a colloidal suspension containing polymeric microspheres of a selected size and shape and a ceramic material such as aluminum oxide to form the porous ceramic matrix. The materials may be consolidated by slip-casting, using a suitable filter medium to provide a porous layer cast from the binary colloidal suspension layers, a dense layer cast from pure alumina, or any combination of porous and dense cast layers using both of these suspensions. After cosolidation, heat is used to decompose the polymeric microspheres to leave pores. The cast ceramic is then sintered at a high temperature and controlled rate of heating to form a porous ceramic body having strength comparable to its dense counterpart.

BRIEF DESCRIPTION OF THE DRAWINGS

The present invention will be described in connection with the accompanying drawings in which.

DETAILED DESCRIPTION OF THE INVENTION

Accordingly, this invention provides a process for fabricating porous ceramics with a controlled microstructure which minimizes the loss in strength due to porosity. The process allows control of pore size, shape and distribution of pores within the ceramic body produced. The control of pore distribution to minimize pore clustering and the effect of surface flaws as noted above, requires manipulating both the pore-to-pore spatial arrangement of pores within an individual unit layer and the arrangement of pores throughout the ceramic body as a whole. Porous ceramic bodies formed by the present method demonstrate strength values comparable to their dense (non-porous) counterparts.

To carry out the process of the present invention, a colloidal suspension is formed containing suspended polymeric microspheres of substantially the same size and shape, preferably spherical, and suspended particles of a suitable ceramic material. This colloidal suspension is then consolidated to remove liquid from the suspension and to form a compact by filtering the suspension through a porous medium and drying the resulting compact. The compact is next heated to selectively decompose the microspheres to leave pores and is then sintered to form a porous ceramic body with evenly distributed, non-contiguous pores. The invention is set forth in greater detail in the description and examples which follow.

Preparation of the Suspension

The colloidal suspension consisting of particles of a suitable ceramic material and the polymeric microspheres may be prepared by mixing a colloidal polymer suspension with a colloidal suspension of ceramic particles. Aluminum oxides ($Al_2O_3$) (hereafter "alumina") is the preferred ceramic material for use in the present invention, and is available in powder form. A preferred alumina powder is alpha alumina and has an average particle size of 0.75 $\mu$m and is available from Sumitomo, Japan. Other ceramic materials such as silicon carbide, boron carbide, silicon nitride, mullite, aluminum nitride, and zirconium oxide, may be used. In a preferred embodiment alpha ("$\alpha$") alumina powder which is commercially available is placed in water to form a suspension and is mixed with organic polymeric microspheres also in suspension to form a binary colloidal suspension. An organic suspension medium may be used instead of water to form the suspension provided that the organic microspheres do not dissolve in the organic medium and codispersion is achieved. It is preferable to form binary colloidal suspensions containing less than 30 volume percent polymeric microspheres.

The microspheres for use in this invention preferably are spherical and consist of a polymer which does not expand during heating and which will decompose without melting and flowing throughout the ceramic matrix. When used in association with other materials in the ceramic matrix, for example, along with binders used during consolidation by tape casting, the microsphere polymer should be capable of decomposing from the matrix after the decomposition temperature of the binders, to prevent mass exit of organic material, which may cause cracking. Also, the decomposition products of such microsphere polymers can then leave the ceramic sample through the percolation channels created by the other organic materials leaving the sample. Cracking may also be caused by expansion of the polymeric material within the matrix. Preferred microsphere polymers for this invention which possess these characteristics are polystyrene and polyvinyldene chloride. Other suitable polymers include polymethyl methacrylate, polystyrene divinylbenzene ("DVB"), polyvinyltoluene, styrene vinyltoluene, and polystyrene butadiene.

The size of the polymeric microspheres as well as the shape, as explained above, determines the size and shape of the pores and thus the strength of the final ceramic product. The larger the pores, the lower the strength. The size and shape of the pores will depend on the size and shape of the initial polymeric microspheres used in the binary colloidal suspension. In the present invention, the preferred shape of the resulting pores is substantially spherical, corresponding to the shape of the original microspheres. The size of the pores may be adjusted, depending on the size of microspheres chosen; for example, the pores will be less than 6 $\mu$m when polystyrene spheres are used, and 30 to 60 $\mu$m when polyvinyldene chloride spheres are used.

The microsphere suspension is prepared in two stages. In the first stage, a monomer of the selected polymer is placed in a liquid such as water, with a reagent such as potassium persulfate to initiate polymerization, and polymerization is conducted. Microspheres as large as 1.7 $\mu$m using, for example, a styrene monomer to form polystyrene, can be obtained at the end of the first stage of polymerization. In the second stage, the particles, prepared by direct polymerization methods from the first stage, are used as "seed" to obtain larger particles. For this purpose, the above particles in suspension and the monomer are mixed in a one-to-one ratio in the reaction vessel and purged with high purity nitrogen gas for 5 minutes. The mixture is shaken overnight to swell the particles by diffusion of the monomer into the seed particles. Then the same amount of initiator is added and suspension is again flushed with nitrogen. The polymerization is performed in a water bath. Using such seeding polymerization technique, polystyrene polymeric microspheres as large as 3.5 $\mu$m can be obtained. Larger microspheres can be obtained by repeating the seeding polymerization with suspensions containing successively larger particles. An additional advantage of this seeding technique is that the microspheres formed do not expand during heating so as to crack the sample.

The spatial distribution of pores within the ceramic body achieved in this invention is a function of stabilization of the particle-particle interactions between the microspheres and particles of ceramic material in the colloidal suspension, as well as the consolidation method and design chosen. It is preferable that pores in a ceramic sample are uniformly spaced and noncontiguous, i.e., they do not form clusters or touch one another, to maximize strength of the sample. Using the method of this invention, it is possible to produce substantially spherical pores after decomposition of the microspheres; the pores are evenly distributed and noncontiguous throughout the matrix. A preferred colloidal suspension, optimizing pore-to-pore spacing, may be achieved by minimizing the physical interactions between individual microspheres, between ceramic particles and between the microspheres and ceramic particles. These interactions include the electrostatic particle-particle attractions and repulsion which result from particle surface charges, which occur during the preparation of the colloidal suspension of particles of ceramic material and microspheres prior to casting. Surface charges can be estimated by measuring the zeta potential, for example, with a "zetameter" (Rank Brothers, Ireland) at the boundary between the suspending medium and the fluid surrounding the particle which moves with it. High zeta potential values which indicate large absolute values of surface charge are preferred because large particle repelling charges assist in dispersing the ceramic particles and microspheres throughout the liquid medium of the colloidal suspension. A highly dispersed colloidal suspension is preferred and may be achieved by preventing flocculation caused by particle-particle attraction.

Stable colloidal suspensions which enable the production of pores which are evenly distributed and non-contiguous, may thus be formed by manipulating parameters of the suspensions, such as pH, and by adding surfactants. It is observed, for example, that polystyrene microspheres are negatively charged in the pH range from 2 to 11, and that the absolute value of the surface charge (i.e., the zeta potential) increases with increasing pH. Therefore, a more stable colloidal suspension of polystyrene may be prepared using a higher pH. In addition, as the pH of the aqueous suspension increases above the isoelectric point of alumina, alumina particles become more negatively charged. At a pH range above 9.5, both polystyrene particles and alumina particles will be negatively charged, and thus fairly stable binary colloidal suspensions of these materials can be prepared. Dilute NH$_4$OH can be used as a pH regulator in the basic range. At the pH range from 7 to 8.5, however, the alumina particles have a very low surface charge, and a surfactant is required to prepare stable binary colloidal suspensions. Anionic surfactants may be used, for example, sodium, or preferably ammonium salt of polyacrylic acid. Another anionic surfactant which may be used includes polyarylsulphonic acid. Non-ionic surfactants may also be used. At the pH range of 7 to 8.5, the surfactant will be adsorbed onto the surface of alumina particles. The presence of unneutralized negative functional groups on the surfactant chains will cause the alumina particles to behave as negatively charged particles. As a result, stable colloidal mixtures which allow the production of porous ceramics with evenly distributed and noncontiguous pores, can be prepared by maintaining strong repulsive forces between the negatively charged alumina particles and the microspheres. The use of an anionic surfactant is preferred because colloidal suspensions with higher particle concentrations can be prepared. Higher particle concentration will be preferred, because: (1) the rate of consolidation will increase; and (2) segregation of polymeric microspheres and the ceramic particles due to density differences of the particles (the density of alumina is 3.36 gm/cc; the density of polystyrene is approximately 1 gm/cc) will be prevented.

Stable colloidal suspensions of polymeric microspheres and ceramic particles can also be achieved when polymeric microspheres become coated with ceramic particles. This may be achieved as described above, for example, by altering the pH of the suspensions and by adding a surfactant. In the acidic pH range (i.e., low pH), ceramic particles such as alumina will coat the polystyrene microspheres which are negatively charged. It is preferable that several layers of the particles of ceramic material be placed around the polymeric microspheres by successively charging and recharging the surface of the microspheres by altering pH or by coating the surface of polystyrene particles with surfactants which will attract the ceramic particles.

Consolidation

After the colloidal suspension is prepared, it is consolidated to form a green compact by filtering, using slip casting, or to form a flexible tape, using tape casting. Consolidation removes the liquid from the suspension.

When the consolidation is performed using slip casting, plaster of paris may be used to filter out the liquid portion of the suspension medium. Other suitable filtering materials such as microfilter paper or any porous filtering media may also be used. When using plaster of paris, the filtering ability of the cast may be altered by changing the ratio of water-to-plaster. A preferred ratio of water-to-plaster for use in the present invention is 100:75. Plexiglass, or Teflon molds, may be used to give the required shape to the cast piece during consolidation. Completion of the consolidation process may require from 1 to 3 hours, depending on the particle concentration of the initial suspension. Suspensions with higher particle concentrations require less time to consolidate since they contain less liquid. External suction may then be applied using a vacuum, and/or pressure (e.g., gas) may be used to hasten both filtration and the drying process.

Tape casting is a method of consolidation which produces ceramic bodies in the form of thin layered tapes. These tapes may be fused together using pressure to form multilayered ceramics, in a variety of shapes. Single ceramic tapes as thick as 50 $\mu$m can be prepared in the tape casting process by using the "doctor blade" technique to spread the colloidal suspension onto mylar or stainless steel films. The doctor blade technique is described by Mistler et al., in *Ceramic Processing Before Firing*, Eds. Onada and Hench, Wiley & Sons, N.Y. (1978), incorporated by reference herein. The doctor blade technique allows one to obtain tapes in the required shape and thickness. If slip casting is used, no other materials are required in the suspension. However, if tape casting is chosen, additional materials such as binders (high molecular weight polymers), wetting agents and defoamers may be added to the above binary colloidal suspension. Binders must be soluble in the solvent used for the suspension. Binders such as Rhoplex AC33 (Rohm/and Haas Co., (Philadelphia, PA) and wetting agents such as Fluorad (FC4-30) (3M, St. Paul, MN) may be used where the solvent is water. These ingredients impart additional strength and flexibility to individual tapes and maintain a better fusion of these layers during the thermoplastic deformation of the binder under the pressure applied to fuse the tapes.

As discussed above, the strength of the porous ceramic is also a function of the spatial distribution of the pores, relative to one another, and as determined by the location of the pores within the ceramic body relative to the surface. In addition to decreased strength as a result of pore clustering, or combining, pores located at or near the surface of a sample will tend to result in a decrease in strength due to the increase in the effect of surface flaws. Therefore, using the methods of the present invention, the strength of a porous ceramic body using polymeric microspheres to form the pores may be maximized by the structural design chosen in the casting process which will determine the distribution of the pores within the ceramic.

In a first embodiment, consolidation of the colloidal suspension may be accomplished by slip casting the suspension as a single, porous layer with pores of substantially the same size and shape, randomly and evenly distributed throughout the ceramic body, including the surface. The suspension is poured into a Plexiglas mold placed, for example, on a plaster of paris filtering medium. After consolidation is completed, the mold is removed from the plaster of paris and the compact is left overnight in the mold. The next day, the compact is taken out of the mold and dried. The resulting compact is subjected to a series of heat treatments to dry the compact, to decompose the microspheres and to sinter the compact, as will be described further below. This embodiment, with non-contiguous pores evenly distributed throughout the entire unit, i.e., some pores near or at the surface, provides a ceramic with continuous channels. Such a product may serve, for example, as a microfilter, and has adequate strength for this purpose. In addition, the use of microspheres provides a method for optimizing pore-to-pore spacing and pore size and shape, as compared to methods for producing porous ceramics previously known in the art. Where a porous ceramic having additional strength is desired or necessary, the embodiments described below may be preferable.

When the pores are separated from the surface in a ceramic sample by a dense layer at the surface, the effect of surface flaws is minimized and the strength of the sample is retained, comparable to its dense state, because, in part, the interaction of surface flaws with pores is reduced. Therefore, in the present invention, a high strength porous ceramic is obtained where a porous layer consisting of the colloidal suspension is slip cast as a "sandwich" between two dense (nonporous) pure layers of ceramic material. This design is achieved by first casting a dense ceramic layer as a single unit in the selected cast, and before this layer is completely dry, as observed visually, it is covered by the colloidal suspension to form a second, porous layer. Before this second, porous layer is dry, an additional dense ceramic layer is cast on top of the porous layer. Layered castings obtained using this slip casting procedure will provide a porous ceramic body of decreased density, but of strength comparable to the dense state. Slip casting allows production of ceramics with various shapes and sizes.

A third consolidation method, tape casting, provides control of the width of the outer layers to a selected dimension, lowering the overall density by decreasing the thickness of the outer, dense layers. This process also allows control of the thickness of the outer layer within a narrow (i.e., 10 $\mu$m) range and provides a faster consolidation process. Thus, in a preferred embodiment, consolidation is performed by tape casting, where individual thin pure ceramic or mixed ceramic-microsphere layers (e.g., approximately 50 $\mu$m) are formed on mylar film using the doctor blade technique. Individual pure ceramic tapes and mixed tapes may then be stacked and fused together, for example, by applying heat and pressure. Several tapes of the same composition, e.g., all pure or mixed, may be fused together, or the tapes may be alternated, pure and mixed. An additional advantage of this embodiment is that by carefully arranging the pure and mixed tapes, a homogeneous stress distribution in the final product may be achieved. Tape cast ceramic samples may also be formed in a variety of shapes and sizes.

The present process provides up to 15 volume percent spherical porosity for randomly and evenly distributed substantially spherical pores throughout a unit layer, or up to 10% volume percent spherical porosity in a ceramic body containing pores distributed throughout a layer which is isolated from the surface by dense layers.

Heat Treatment

Both the slip-cast samples and tapes should be dried carefully to prevent cracking. Slip-cast pieces may be dried in a furnace by heating them gradually from room temperature up to 110° C. for example over a week's period of time. Faster drying may cause undesirable micro-cracks in the samples. The tape layers can be dried at room temperature in a clean container.

After consolidation and drying of the samples, the polymeric microspheres are decomposed by heating to leave a plurality of pores with substantially the same size and shape. The preferred manner of accomplishing decomposition of the polymeric microspheres is to heat treat ("soak") the cast body at a temperature below the equilibrium degradation temperature of the polymer chosen, to prevent release en masse of by-products of organic decomposition, i.e., the other organic material such as binders which may be present, from the matrix. In addition to temperature selection, it is important to control the rate of heating to prevent cracking of the sample. For example, using polystyrene microspheres, the consolidated ceramic is preferably preheated to 1000° C. at a rate of approximately 22.5° C. per hour. Preheating may be accomplished at temperatures in the range of 600° to 1000° C. and at rates in the range of 20° to 80° C. per hour. This preheating step decomposes the organics without causing any bloating or delamination of the sample. Preheating may be carried out in an electrical resistance furnace operated in air. After preheating, the consolidated ceramic is then solid phase sintered at a higher temperature, preferably by heating at 1550° C. at a rate of 254° C. per hour for one hour to obtain the final porous ceramic body. Sintering may be performed at a temperature in the range of 1300°–1500° C. for one hour at a rate of 250° to 750° C. per hour.

Strength Determinations

The fracture strength of the porous ceramic bodies formed as described herein may be determined using a standard strength test such as the bending test, described by Baretta in *Methods for Assessing the Structural Reliability of Brittle Materials*, Eds. Freiman and Hudson, ASTM Special Technical Publication 844, (1982) incorporated by reference herein. Bend strength is defined as the maximum tensile strength at failure and is often referred to as the "modulus of rupture." Bend strength is expressed in units of kpsi (lb/in$^2$)×10$^3$ or MPa(N/m$^2$)×10$^6$ where N=Newton and m=meter. Bending strength may thus be characterized using a 3-point or 4-point bending load. In 3-point bending, the load is placed at the center of the test sample, whereas in 4-point bending, the load is placed at two positions on the sample thus applying tensile stress over a range on the surface of the sample. In the examples which follow, bend strength measurements were made using both 3-point and 4-point bending. 3-point bending was used where a Knoop indentation was made to demonstrate the effects of pore size and amount (volume percent) of porosity on strength measurements. 4-point bending was used on the porous ceramics produced using the process described herein to provide more accurate and reliable strength measurements. Because the flaw size will differ between ceramic samples, however, 4-point bending will show variation in the strength measurements obtained.

The following Examples are presented to illustrate the present invention and to assist one of ordinary skill in making and using the same. The Examples are not intended in any way to otherwise limit the scope of the disclosure or the protection granted by Letters Patent hereon.

EXAMPLE 1

For the following Examples, measurement of particle size was made either by utilizing a Sedigraph Particle Size Analyzer (Sedigraph 5000 ET, Micrometrics Instruments Corporation, GA), for alumina particles or by analysis of SEM micrographs. Organic decomposition of the microspheres and sintering were carried out in a computer-controlled, electrical resistance furnace (Lindberg Box Furnance). At the end of each sintering run, the power was switched off and the sintered body was furnace-cooled to room temperature. All sintering was carried out in the air.

The density of the porous specimens was determined by water displacement using the well-known Archimedes method after the samples were cut and prepared for mechanical testing.

For strength measurements, samples were cut into rectangular specimens with a diamond blade. Strength tests were made using a 4-point bending fixture (University of Washington, Seattle, WA) with a 1.5 overall span and 0.5 innerspan. A one-inch span length was used for the 3-point bending strength tests measurements. An Instron machine (Model 1122, Canton, MA) operated at 0.1 mm hr cross head speed was utilized to break the samples.

Preparation of the Alumina-Microsphere Colloidal Suspension

A 30 volume percent alumina suspension was prepared by adding α-alumina powder (Sumitomo, Japan) into water. The pH of the suspension was kept above 9 by adding dilute ammonium hydroxide during addition of the alumina. The suspension was continuously stirred and ultrasonicated when required to break-up agglomerates of particles. The alumina suspension was mixed with a polystyrene suspension (13 volume percent) prepared at a pH of 10.6 to form a binary suspension. Polystyrene suspensions of greater volume percent polystyrene, for example, 5 oz., may be prepared. The polystyrene was produced by direct polymerization and seeding polymerization as described above. The polystyrene suspension contained spherical organic microspheres of less than 6 μm in size. The binary colloidal suspension was left to stir overnight. After 12 hours of stirring, the colloidal suspension was ultrasonicated and its pH adjusted to 10.6 by adding dilute ammonium hydroxide.

Consolidation and Heat Treatment

Figure 1A:
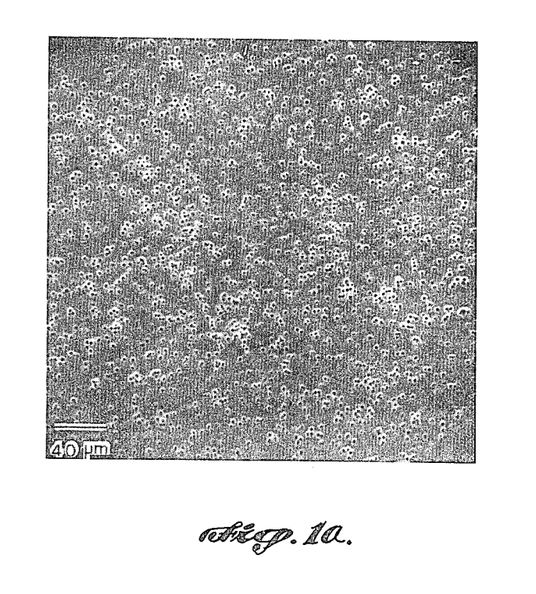
FIGS. 1A and 1B show scanning electron microscope (SEM) micrographs (mag 318× and 3180×) of an alumina ceramic matrix containing evenly distributed, small, spherical pores produced by slip casting.
Figure 1B:
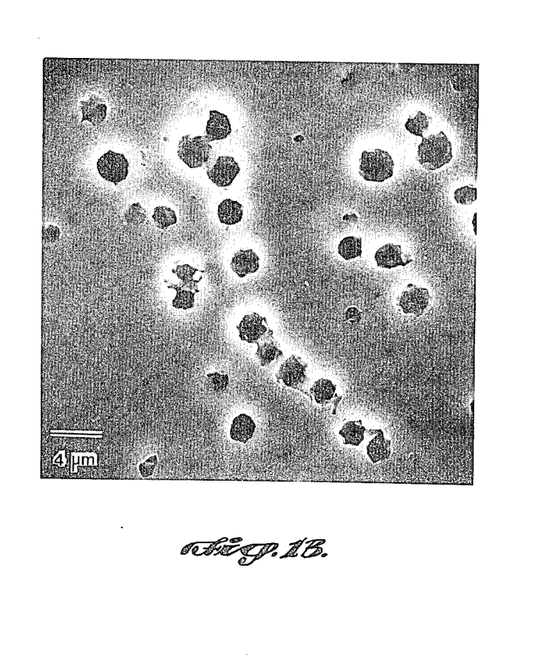

The colloidal suspension was slip cast as a single porous layer using plaster of paris as the filtering medium. A plexiglass mold was placed on the plaster of paris and the suspension was poured into the mold. When casting was complete, the plexiglass mold was removed from the plaster of paris and the cast piece was left in the mold for 24 hours. The following day it was taken out of the mold and placed into an oven at 30° C. The temperature of the oven was gradually increased over a week's time to 100° C. The sample was then heated to 1000° C. at a rate of 22.5° C. per hour to remove the remaining water and to decompose the polystyrene microspheres. The partially sintered body was further heated to 1550° C. to obtain the final ceramic body with controlled microstructure. The dimensions of the cast piece were 12 mm by 96 mm by 47 mm. A cross section of the porous sample containing randomly but evenly distributed, small (3 to 6 $\mu$m), substantially spherical pores is depicted in the Scanning Electron Micrographs of FIG. 1.

The porous sample obtained was tested for bending strength. Rectanglar bars were prepared by cutting the sample with a diamond saw. To minimize the variations in strength due to different flaw sizes on the edges of the specimens, the edges were beveled on wet #600 grit SiC paper and polished using a 6 $\mu$m diamond compound. 4-point bending strengths were determined using the Instron machine operated at 0.1 mm/hr cross head speed.

Figure 2:
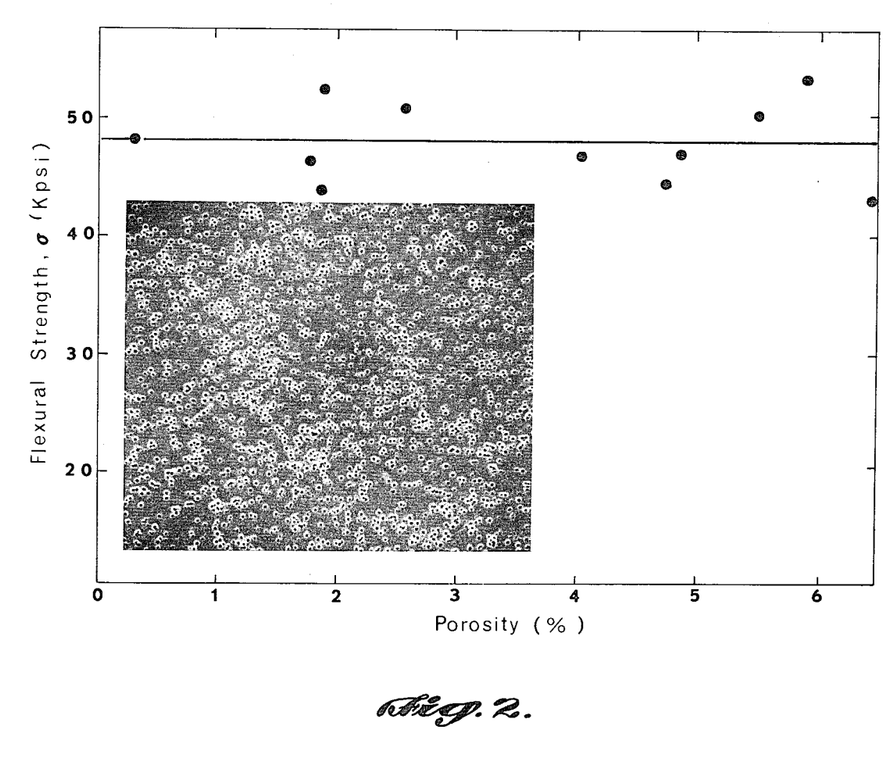
FIG. 2 is a graph illustrating the effect of evenly distributed spherical pores within an alumina ceramic matrix on the 4-point bending strength of the ceramic, and includes an inset SEM micrograph of the porous ceramic.

FIG. 2 illustrates the effect of increasing porosity on the bending strength of samples with porous surfaces. The strength values remain relatively constant in the porosity range studied. On the other hand, the constant strength value is somewhat lower (12 kpsi) than the strength of the pure, dense alumina counterpart (60 kpsi). This is believed to be due to the effect of surface flaws, which is larger than that of surface flaws in the dense samples, causing failure in the porous samples at lower strength levels. In order to characterize the effect of the surface flaws on the strength of porous specimens, the controlled surface flaw technique (CSF) was used. Sonuparlak, et al., "High Porous Ceramics: II Mechanical Properties" to be submitted in 1986 to *J. Am. Ceram. Soc.*, incorporated by reference herein. The surface of the specimen was polished using a 1 $\mu$m diamond compound, and the surface was indented (flawed) using Knoop Indentation. Knoop indentation provides a means for standardizing the effect of surface flaws between samples to obtain comparable strength measurements and to decrease the statistical error in measurements. The size of the indentation was measured at 130 $\mu$m in the major diagonal length. The orientation of the impression was across the tensile direction of the test bar. Specimens were then tested with a 3-point bending test using the Instron machine operated at 0.1 mm/minute cross head speed to compare strengths of porous samples with dense samples to determine the effect of pore size and volume percent porosity of surface flaws causing the material to fail or fracture.

Figure 3:
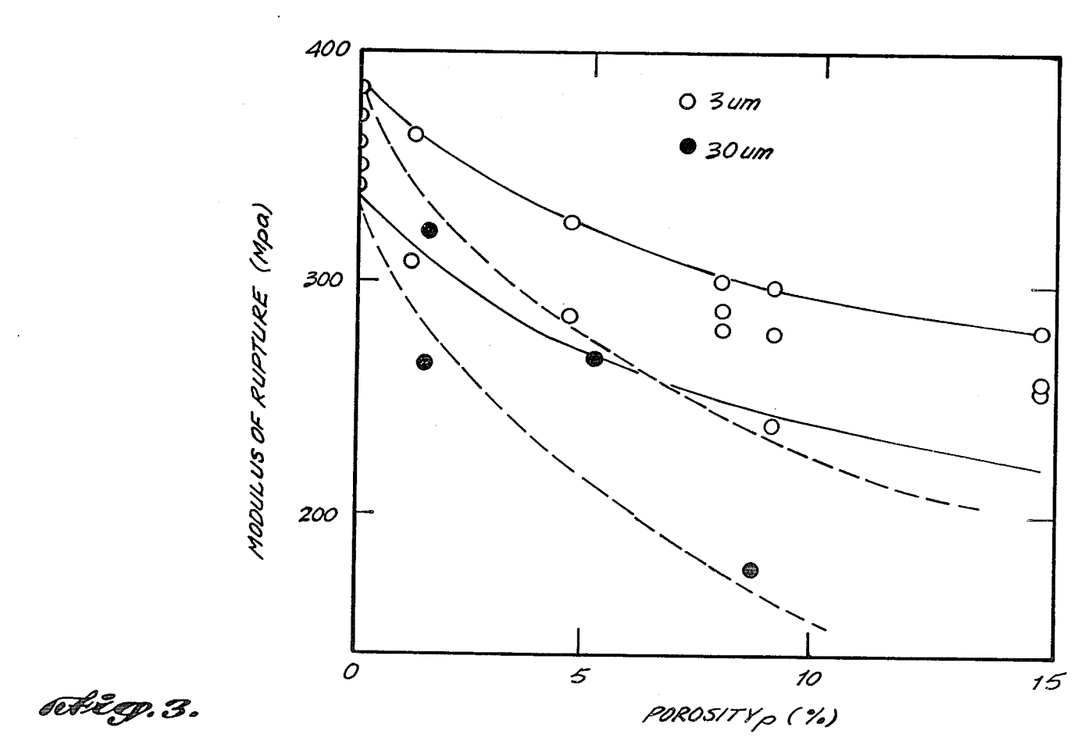
FIG. 3 is a graph illustrating the effect of evenly distributed spherical pores (3–6 $\mu$m and 30–60 $\mu$m) within an alumina ceramic matrix on the 3-point bending strength of the ceramic when surface flaws are corrected by Knoop Indentation (130 $\mu$m)
Figure 4:
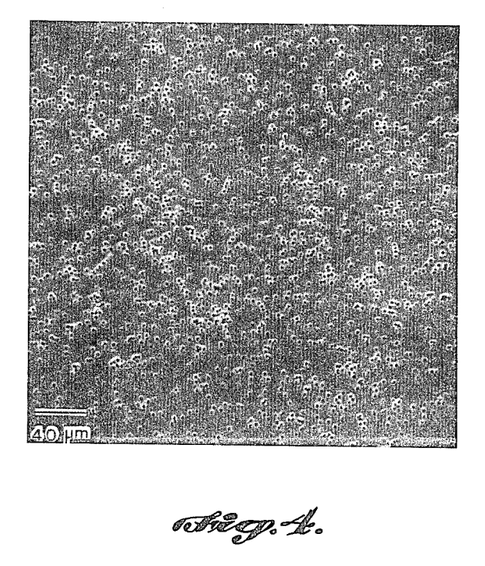
FIG. 4 is a SEM micrograph (mag. 318×) of an alumina ceramic matrix containing a porous alumina layer sandwiched between two dense alumina layers, produced by slip casting.
Figure 5:
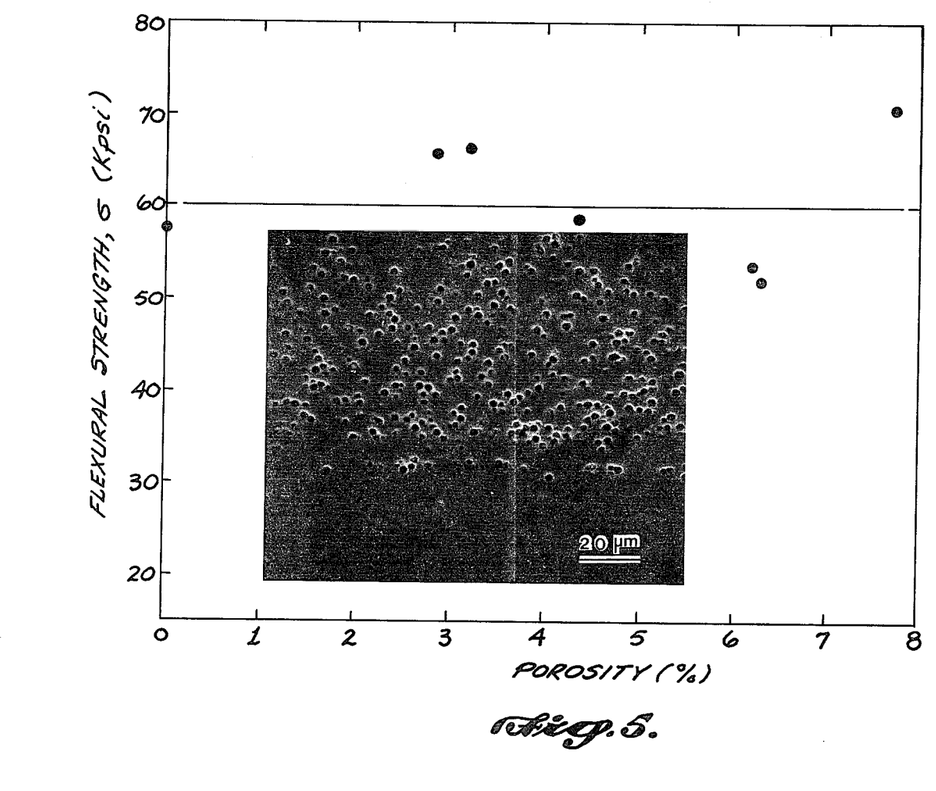
FIG. 5 is a graph illustrating the effect of evenly distributed, non-contiguous spherical pores on the 4-point bending strength of a porous alumina layer sandwiched between dense alumina layers, and includes an inset SEM micrograph (mag. 660×) of the ceramic.
Figure 6A:
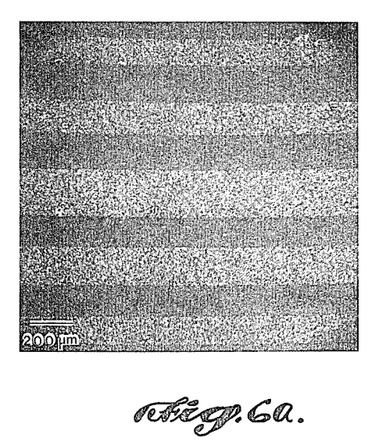
FIGS. 6a and 6b shows SEM micrographs (mag. 30× and 300×) of a porous ceramic produced by stacking and fusing together individual tape cast polystyrene alumina layers alternating with pure alumina layers (50 $\mu$m thick).
Figure 6B:
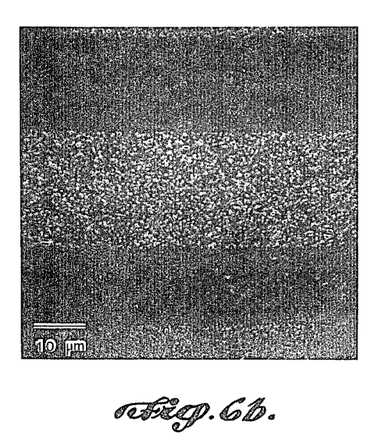

FIG. 3 illustrates the 3-point bending test results obtained as a function of the volume fraction of porosity and pore size (3 $\mu$m or 30 $\mu$m). Due to the interaction between surface flaws and surface pores with increasing pore size, the effective surface flaw size becomes larger than that of its real size. Therefore, in samples with surface pores, the increase in effective surface flaws causes a decrease in strength of the sample, with both increasing pore size and increasing volume fraction of porosity. As is discussed below, and as illustrated in FIGS. 4, 5 and 6, when a porous sample is given a dense surface, the effect of pores on the surface flaws is minimized and kept similar to pure, dense alumina, and thus the strength of the sample does not decrease with increasing porosity.

EXAMPLE 2

A 54 volume percent $\alpha$-alumina suspension was prepared in water using an anionic surfactant composed of 0.5 weight percent ammonium salt of polyacrylic acid and 0.08 weight percent citric acid to stabilize the suspension. The weight percentage of ammonium salt of polyacrylic acid and citric acid was calculated based on the dry weight of aluminum oxide used. The alumina suspension was ultrasonicated to break up agglomerates with a polystyrene suspension (30 to 40 volume percent). The colloidal mixture was then slip cast, dried and sintered to form a single porous layer as described above in Example 1. The sintered sample was cut into rectangular bars and prepared for 3-point mechanical testing, as described above.

Porous ceramics with similar microstructure to those depicted in FIG. 1 were obtained. FIG. 3 shows the variation in strength with porosity for these ceramics.

Thus, strength decreases with decreasing pore size.

EXAMPLE 3

A 30 volume percent $\alpha$-alumina suspension was prepared as described above in Example 1. The suspension was divided into three parts, 9 ml of one of these parts of alumina was mixed with 6 ml of a 13 volume percent polystyrene suspension to prepare the binary colloidal mixture of alumina and polystyrene microspheres. 20 ml of pure alumina suspension was cast, using plaster of paris as the filtering medium, in a plexiglass mold to form the first dense (nonporous) layer. 15 ml of the binary colloidal mixture of polystyrene and alumina was then cast as a second porous layer before the first dense layer completely dried as determined by visual inspection. A third dense layer was then formed by casting 20 ml of pure alumina suspension on top of the porous layer prior to its drying. The sample was then dried, sintered and tested similar to the methods used in Example 1. FIG. 4 is an SEM micrograph of the resulting ceramic.

FIG. 5 is a graph of the strength of samples formed as described in this Example, as a function of increasing volume percent porosity. The strength of the porous ceramic bodies formed does not decrease with increasing porosity because of the absence of interaction of pores with surface flaws as a result of the dense layer at the surface.

EXAMPLE 4

A 35-40 volume percent $\alpha$-alumina-polystyrene suspension was prepared in two stages. In the first stage, the alumina was dispersed in water using 0.5 weight percent ammonium salt of polyacrylic acid as an anionic surfactant. The weight percentage of the anionic surfactant was calculated based on the dry weight of aluminum oxide used. The alumina suspension was ultrasonicated to break up agglomerates and then mixed with the 30 to 40 volume percent polystyrene suspension and again ultrasonicated. The suspension was stirred a few hours. In the second stage, 16 weight percent binder Rhoplex AC33, 0.13 weight percent fluorad FC-430 as wetting agent, and 0.001 weight percent defoamer were added to the above suspension during stirring. The mixture was stirred for at least 24 hours. The next day a small amount of the viscous suspension was spread as a homogeneous tape on mylar film using the Doctor Blade technique. The tapes were dried in air at room temperature.

Pure alumina tapes were made as above, without using a polystyrene suspension.

Dried tapes were cut in the required dimensions with a razor blade and stacked on top of each other in the selected design. They were then fused together by heating at 195° C. and using 400–500 psi pressure from a hydraulic press. The samples were then fired as described above.

FIG. 6 illustrates the microstructure of a ceramic body produced through sintering of the tape layers obtained as described above. Using the method of the present invention, the thickness of both the mixed and pure alumina tapes may be controlled to within several microns (10 $\mu$m), by making individual tapes thinner or thicker.

As is demonstrated by the above-described examples, the present invention provides porous ceramics containing a plurality of pores of a predetermined size and shape, with the pores evenly distributed and noncontiguous throughout the ceramic body, and with strength comparable to their dense counterparts. Pore size, shape and spacing are controlled using polymeric microspheres in a colloidal suspension containing particles of a suitable ceramic material. The pore size that one selects will be determined by the particular application for which the porous ceramic is being produced. As noted above, the size and shape of the pores is established by the size and shape of the polymeric microspheres chosen. A factor which may establish the lower limit on the size of the microspheres using the process described herein, is that with decreasing size of the ceramic particles, smaller microspheres may be used to form spherical pores. However, the size of the ceramic particles is itself limited by the difficulty of dispersing such small particles in a suspension. For alpha alumina, particles ranging from 0.1 $\mu$m to 1 $\mu$m may be used with microspheres 2 $\mu$m to 3.5 $\mu$m in diameter to form pores. In general, for applications requiring greater strength, small (less than 10 $\mu$m) substantially spherical pores are preferred, and a dense surface layer should be provided for the porous ceramic body. We have found that small, spherical microspheres 3 $\mu$m in diameter produce a strong, porous ceramic suitable for many applications such as substrates for computer hardware. Larger pores may be desirable in some applications. For example, where ceramics are used as implants, in humans to replace bone, larger pores (50–250 $\mu$m) will enable the living tissue to more easily penetrate into the pores of the ceramic.

While one method for producing porous ceramics with strength comparable to the dense state has been described in the above examples, other methods for producing porous ceramics with controlled microstructure are possible. For example, a laser beam or an ion beam (Argon), followed by acid etching (5% solution hydrofluoric acid) as described by Hecht, in Laser and Applications, p. 22–23, April 1986, incorporated by reference herein, may be used to place pores of a specified size in a precise location relative to one another within a ceramic sample.

While the present invention has been described in conjunction with preferred embodiments, one of ordinary skill after reading the foregoing specification will be able to effect various changes, substitutions of equivalents, and alterations to the compositions and methods set forth herein. It is therefore intended that the protection granted by Letters Patent hereon be limited only by the appended claims and equivalents thereof.

The embodiments of the invention in which an exclusive property or privilege is claimed are defined as follows:

1. A process for preparing a porous ceramic body with controlled microstructure consisting of pores of predetermined size, shape and spatial distribution, comprising the steps of:
   a. forming a colloidal suspension of polymeric microspheres of substantially the same size and substantially spherical in shape, and particles of a ceramic material in a liquid medium;
   b. stabilizing the particle-particle interactions between the microspheres and the particles of ceramic material in the colloidal suspension;
   c. consolidating said colloidal suspension to remove the liquid and to form a compact body; and
   d. heating said compact body to decompose said microspheres and to sinter said compact body into a porous ceramic body with a plurality of evenly distributed, noncontiguous pores.

2. The process according to claim 1 wherein said step of heating comprises:
   a. preheating said compact body to decompose said microspheres; and
   b. thereafter sintering said compact body into a porous ceramic body.

3. The process according to claim 1 or 2 wherein said microspheres are in the range of 2 $\mu$m to 6 $\mu$m in diameter.

4. The process according to claim 1, wherein said polymeric microspheres comprise a polymer selected from the group consisting of polystyrene, polyvinyldene chloride, polymethyl methacrylate, polystyrene divinylbenzene, polyvinyl toluene, styrene vinyltoluene, and styrene butadiene.

5. The process according to claim 4 wherein said microspheres comprise polyvinyldene chloride.

6. The process according to claim 5 wherein said polymeric microspheres are 30 to 60 $\mu$m in diameter.

7. The process according to claim 4 wherein said microspheres comprise polystyrene polymer.

8. The process according to claim 5 wherein said polystyrene microspheres are 3 to 6 $\mu$m in diameter.

9. The process according to claim 1 wherein said ceramic precursor material is selected from the group consisting of alumina, silicon carbide, boron carbide, silicon nitride, aluminum nitride, zirconium oxide, mullite, cordierite, and glass-ceramics, and combinations thereof.

10. The process according to claim 9 wherein said ceramic material is alpha alumina.

11. The process according to claim 10 wherein said alpha alumina is used in the form of a powder having particles with an average diameter of 0.75 $\mu$m.

12. The process according to claim 1 wherein the step of consolidating comprises slip casting said colloidal suspension using a filtering medium.

13. The process according to claim 12 wherein plaster of paris is used as the filtering medium.

14. The process according to claim 12 wherein said slip casting comprises casting the colloidal suspension so that said ceramic body comprises a single, porous layer.

15. A porous ceramic having controlled microstructure formed by the process according to claim 14.

16. The process according to claim 14 wherein said polymeric microspheres comprise polystyrene.

17. The process according to claim 14 wherein said ceramic material is alpha alumina.

18. The process according to claim 12 wherein said slip casting comprises the steps of:
 a. casting a first layer of pure ceramic material;
 b. casting a second layer of colloidal suspension containing particles of ceramic material and polymeric microspheres over said first pure ceramic material layer; and,
 c. applying a third pure ceramic material layer over said second layer to form a multi-layered ceramic body.

19. The process according to claim 18 wherein said step of casting a second layer of colloidal suspension over said first pure ceramic layer comprises adding said second layer prior to the completion of the drying of said first layer, and said step of applying a third pure ceramic material layer over said second layer comprises adding said third layer prior to the drying of said second layer.

20. A porous ceramic having a controlled microstructure formed by the process according to claim 18.

21. The process according to claim 18 wherein said ceramic material is alpha alumina.

22. The process according to claim 18 wherein said polymeric microspheres comprise polystyrene.

23. The process according to claim 1 wherein the step of consolidating comprises tape casting said colloidal suspension.

24. The process according to claim 23 wherein said colloidal suspension further comprises binders, defoamers and wetting agents.

25. The process according to claim 23 wherein said tape casting comprises the steps of:
 a. consolidating pure ceramic material into at least one pure ceramic tape;
 b. consolidating a colloidal suspension containing particles of a ceramic material and polymeric microspheres into at least one mixed ceramic tape; and wherein said process further comprises the steps of:
 c. stacking said pure ceramic material tapes and mixed tapes in alternating arrangement; and,
 d. fusing said tapes together.

26. The process according to claim 25 wherein said ceramic material comprises alpha alumina.

27. The process according to claim 25 wherein said polymeric microspheres comprise polystyrene polymer.

28. A porous ceramic having a controlled microstructure formed by the process according to claim 25.

29. The process according to claim 25 wherein said step of stacking comprises stacking a plurality of pure ceramic tapes together.

30. The process according to claim 25 wherein said step of stacking comprises stacking a plurality of mixed tapes together.

31. A porous ceramic having a controlled microstructure formed by the process according to claim 1 or 2.

32. The process according to claim 1 wherein the step of forming said colloidal suspension comprises stabilizing said microspheres and ceramic particles in the suspension so as to produce pores which are evenly distributed and noncontiguous throughout the ceramic body formed.

33. The process according to claim 32 wherein the pH of said colloidal suspension is maintained in the range of 2 to 11.

34. The process according to claim 33, wherein the pH of said colloidal suspension is maintained at approximately 9.5.

35. The process according to claim 32 wherein a surfactant is added to said colloidal suspension.

36. The process according to claim 35 wherein said surfactant is an anionic surfactant.

37. The process according to claim 36 wherein said surfactant is the ammonium salt of polyacrylic acid and citric acid.

38. The process according to claim 37 wherein the pH of said colloidal suspension is in the range of 7 to 9.

39. The process according to claim 1 wherein said colloidal suspension is a binary suspension.

40. The process according to claim 2 wherein said preheating step to decompose said microspheres is performed by heating said compact body in the range of 600° to 1000° C. at a heating rate in the range of 20° to 80° C. per hour.

41. The process according to claim 40 wherein said polymeric microspheres are decomposed by preheating to 1000° C. at a heating rate of approximately 22.5° C. per hour.

42. The process according to claim 2 wherein said sintering step comprises heating said compact body to a temperature in the range of 1300° to 1550° C., at a rate in the range of 250° to 750° C. for one hour.

43. The process according to claim 42 wherein said sintering comprises heating said compact body to 1550° C. at a rate of 254° C. per hour.

44. The porous ceramic according to claims 15, 20 or 28, wherein said microstructure consists of a plurality of substantially spherical pores of substantially the same size, said pores evenly distributed and noncontiguous throughout the porous ceramic matrix.

45. A porous ceramic according to claim 15 having a controlled microstructure consisting of a plurality of pores of substantially the same size and shape, said pores evenly distributed and noncontiguous throughout the porous ceramic matrix, and having strength comparable to its dense state.

46. The ceramic according to claim 45 wherein said pores are substantially the same size and shape.

47. The ceramic according to claim 45 wherein the pores are substantially spherical.

48. The porous ceramic according to claim 45 formed by a process comprising:
 a. forming a colloidal suspension of polymeric microspheres of a predetermined size and shape, and particles of a ceramic material in a liquid medium;
 b. consolidating said colloidal suspension to remove the liquid and to form a compact body; and
 c. heating said compact body to decompose said microspheres and to sinter said compact body into a porous ceramic body with a plurality of evenly distributed and noncontiguous pores.

49. The porous ceramic according to claim 48 wherein the step of consolidating comprises slip casting said colloidal suspension using a filtering medium.

50. The porous ceramic according to claim 49 wherein said slip casting comprises casting the colloidal suspension so that said compact body comprises a single, porous unit layer.

51. The porous ceramic according to claim 50 wherein said slip casting comprises the steps of:
 a. casting a first layer of pure ceramic material;
 b. casting a second layer of colloidal suspension containing particles of ceramic material and polymeric microspheres over said pure ceramic material first layer; and, c. applying a third pure ceramic material layer over said second porous layer to form a multi-layered ceramic body.

52. The porous ceramic acording to claim 50 wherein said step of casting a second layer of colloidal suspension over said first pure ceramic layer comprises adding said second layer prior to the completion of the drying of said first layer, and said step of applying a third pure ceramic material layer over said second layer comprises adding said third layer prior to the drying of said second layer.

53. The porous ceramic according to claim 51 wherein the step of consolidating comprises tape casting said colloidal suspension.

54. The porous ceramic according to claim 53 wherein said tape casting comprises the steps of:

a. consolidating pure ceramic material into at least one pure ceramic tape;

b. consolidating a colloidal suspension containng particles of a ceramic material and polymeric microspheres into at least one mixed tape; and wherein said process further comprises the steps of:

c. stacking said pure ceramic tapes and mixed tapes in alternating arrangement; and, d. fusing said tapes together.

55. The porous ceramic according to claim 52 wherein said step of stacking comprises stacking a plurality of pure ceramic tapes.

56. The porous ceramic according to claim 52 wherein said step of stacking comprises stacking a plurality of mixed tapes together.

* * * * *

UNITED STATES PATENT AND TRADEMARK OFFICE
CERTIFICATE OF CORRECTION

PATENT NO. : 4,777,153

DATED : October 11, 1988

INVENTOR(S) : Sonuparlak et al.

It is certified that error appears in the above-identified patent and that said Letters Patent is hereby corrected as shown below:

Column 3, line 39, "cosolidation" should be --consolidation--

Column 9, line 52, "Baretta" should be --Baratta--

Column 12, line 25, "parts," should be --parts.--

Column 18, line 5, "containng" should be --containing--

Column 12, line 66, "homogeneous" should be --homogenous--

Signed and Sealed this

Thirteenth Day of June, 1989

Attest:

DONALD J. QUIGG

Attesting Officer

Commissioner of Patents and Trademarks